June 23, 1936. A. L. BOEGEHOLD ET AL 2,044,897
METHOD OF MAKING BRONZE BEARINGS AND BLANKS THEREFOR
Filed May 12, 1933 2 Sheets-Sheet 1
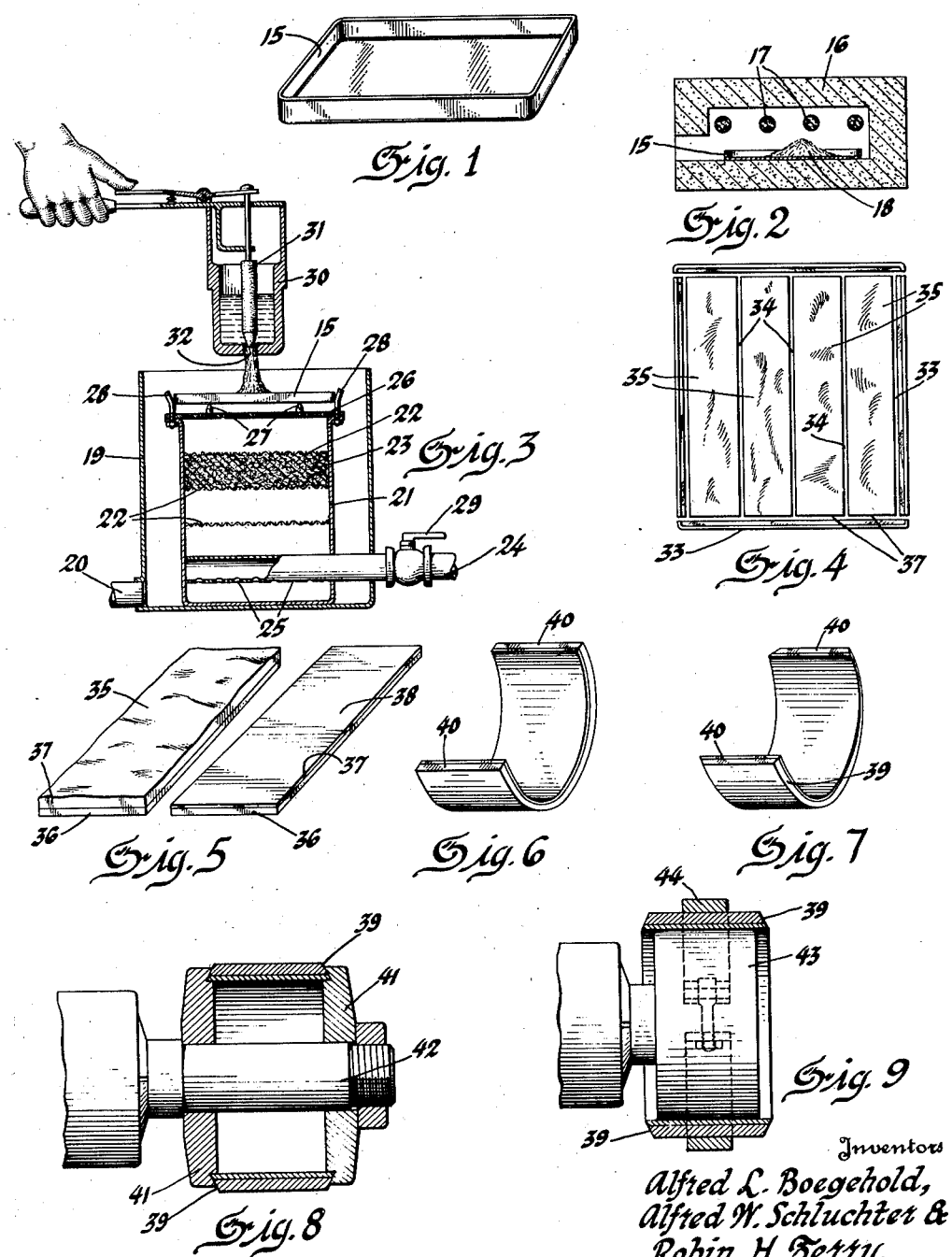
Inventors
Alfred L. Boegehold,
Alfred W. Schluchter &
Robin H. Betty.
By Blackmore, Spencer & Flint
Attorneys June 23, 1936.  A. L. BOEGEHOLD ET AL  2,044,897
METHOD OF MAKING BRONZE BEARINGS AND BLANKS THEREFOR
Filed May 12, 1933  2 Sheets-Sheet 2
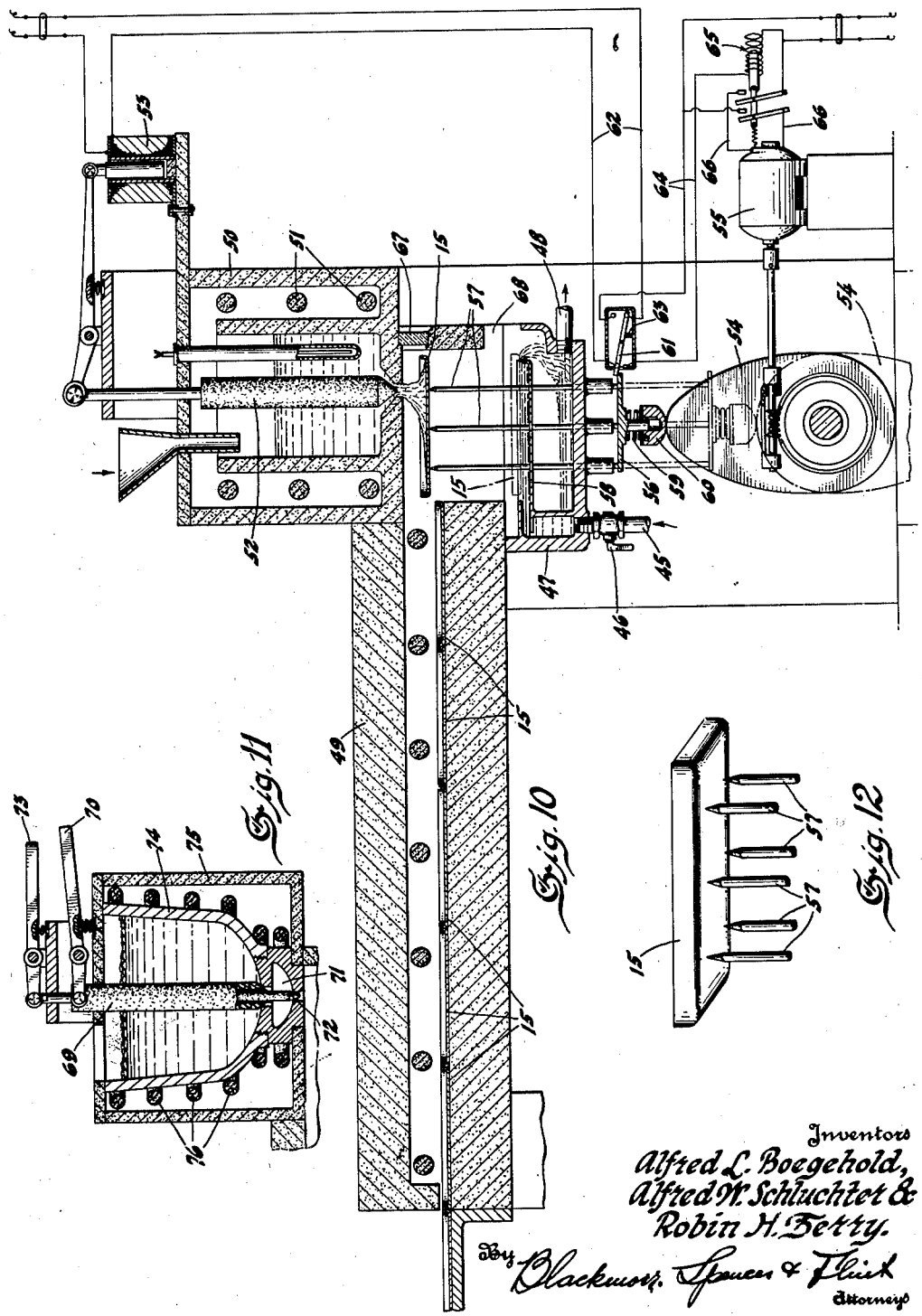

Patented June 23, 1936

2,044,897

UNITED STATES PATENT OFFICE 2,044,897

METHOD OF MAKING BRONZE BEARINGS AND BLANKS THEREFOR

Alfred L. Boegehold, Detroit, Alfred W. Schluchter, Dearborn, and Robin H. Terry, Detroit, Mich., assignors, by mesne assignments, to General Motors Corporation, Detroit, Mich., a corporation of Delaware Application May 12, 1933, Serial No. 670,658

9 Claims. (Cl. 29—149.5)

Our invention relates to bearings for automobile engines and other machines and devices wherein bearings of exceptional endurance, low friction loss and absence from scoring of the journals with which they are used (such as crank shaft and crank pin journals) are desired results to be attained; and particularly to bearings formed by bending into proper form flat strips comprising a steel support or backing to which a plastic bronze facing or wearing surface has been applied while in a molten condition, and which bronze facing is autogenously united with the back by welding, by fusion of the meeting surfaces together, or within the scope of whatever language may be appropriate to express the idea of the joining of the two layers together so permanently and perfectly that they cannot be separated and so that the two form in effect a single unitary metallic structure.

Our invention contemplates a process for making bearings of the type above defined, and the same consists in the performing of various steps or operations in proper sequence whereby such bearings are produced. The invention being for a process is independent of any particular apparatus, as the various steps thereof may be performed by any apparatus suitable for the performing of the steps wherein the invention consists; and the various tools, fixtures and devices illustrated and hereinafter referred to in explaining our invention are conventional, and not necessarily such as may be used in the actual and commercial production of bearings in accordance with the process wherein the invention consists.

By "plastic bronze" we mean a mixture the principal ingredients of which are copper and lead; although other metals such, for example, as tin or nickel or both may be present in small quantities. Disregarding these, a plastic bronze may be composed of 75% to 50% of copper and 25% to 50% of lead. The temperature at which such bronzes are completely molten varies somewhat, but within a comparatively narrow range, with their composition—with the amounts of copper and of lead which constitutes substantially their entire mass; but a temperature of 1760° F. may be taken as an approximate temperature of complete fusion at which all such plastic bronze compositions—that is all the ingredients thereof—become molten and assume a liquid form. Steel back bearings having plastic bronze facings or wearing surfaces united therewith by a fusing of the metals together throughout their meeting surfaces have proven especially satisfactory in automobile and similar service.

Inasmuch as the performance of the process hereinafter described in detail results in a bearing having characteristics due to and dependent upon the process, and particularly to certain of the steps thereof, we regard our invention as extending to and including a bearing made in accordance with the process, as the two are inseparable in the sense that the bearing produced possesses certain characteristics hereinafter enumerated which are due to certain steps of the process, and the process results in and can result in nothing other than a bearing having those characteristics.

In the drawings wherein, as explained, various apparatus, tools, and devices suitable for use in performing the process wherein our invention consists are illustrated:

Figure 1 is a perspective view showing a shallow iron or steel pan or tray made use of in initiating the process.

Figure 2 is a view illustrating heating and fluxing steps to which the pan is subjected.

Figure 3 is a view illustrating the pouring of molten plastic bronze into the tray and the sudden cooling or quenching of the tray and the molten bronze contained therein.

Figure 4 is a view showing how the pan and its contents are cut to form narrow strips of steel having plastic bronze facings fused to them.

Figure 5 is a perspective view showing a strip in its initial form, and also after the surface of the plastic bronze thereupon has been smoothed by a planing, milling or equivalent operation.

Figures 6 to 9 are views illustrating steps performed upon smoothed strips to convert them into finished bearings.

Figure 10 is a schematic sectional view showing a different type of furnace, and different means for supplying molten plastic bronze to the trays and for cooling them.

Figure 11 is a view showing a modified form of crucible for melting the plastic bronze and measuring the amount thereof supplied to the trays.

Figure 12 is a view showing a detail.

Referring now to the drawings we first make shallow pans or trays 15 from sheet iron or steel having a thickness on the order of $\tfrac{1}{16}$" in case bearings for automobile engines are to be made. These may be made by any suitable stamping, pressing, and shaping operation, and we have not illustrated a press whereby they may be made as any suitable press may be used for that purpose.

The thickness of the sheet metal used will vary with the particular bearings to be made, being thicker for large and heavy bearings than for bearings of small diameter; and the depth of the pans, as determined by the height of the side wall thereof, will be not greater than is necessary to produce a layer of plastic bronze of sufficient thickness to permit the finishing operations hereinafter described.

The trays 15 are next heated to a temperature around 1800° F. to 2100° F. preparatory to having the plastic bronze supplied thereinto by any suitable furnace (as by an electrically heated furnace 16 having high resistance heating elements 17 as indicated conventionally in Figure 2) into which the trays are introduced, and from which they are removed as by suitable tongs; or an electrically heated furnace of the type wherein the trays are moved in continuous succession through the same, as illustrated in 10, may be used when bearings are to be produced in large quantities. As stated, however, the particular kind of furnace used to heat the trays is of secondary importance and any type or kind suitable to that end may be used; and as a particular definite temperature we recommend 1900° F., as nearly as temperatures may be determined, as a tray temperature with which we have secured satisfactory results and one suitable for use in performing our process.

At the time when molten plastic bronze is supplied to the steel trays their inner surfaces must be free from oxidation; and their temperature will be sufficiently high so that after the plastic bronze has been poured thereinto the equalized temperature of the liquid bronze and of the trays will be above the melting (freezing) temperature of the bronze, which is around 1760° F.; as otherwise the molten plastic bronze upon coming into contact with the bottoms of the trays (as will hereinafter appear) would be chilled and would not flow and form a layer of substantially uniform thickness upon said bottoms as is necessary in producing bearings in accordance with our process. Preferably the trays are heated initially to a temperature above the melting (freezing) temperature of the plastic bronze so that when the bronze is poured into them there is no tendency upon the part of the molten bronze to solidify at any point throughout the area of the tray bottoms as the equalized temperature after pouring must as aforesaid be above that at which the bronze freezes. We have in the working of our process secured satisfactory results by heating the trays to temperatures between 1800° F. and 2100° F., the temperature after pouring being somewhat above the freezing temperature of the bronze when the lower temperature is used, and above that point to a greater degree at the higher temperature.

The proper and requisite tray temperature at the time when the molten plastic bronze is poured thereinto may also be secured by heating the trays to a temperature somewhat below the melting point of the bronze, and by heating the bronze above its melting point to an extent such that when the molten bronze is poured into the trays it will impart sufficient heat to them to raise their temperature to a point above the melting (freezing) point of the bronze, which is around 1760° F.; and inasmuch as the temperature to which the trays are heated (irrespective of the particular manner in which the heating is accomplished or done) is in all cases not greatly different from that at which the plastic bronze melts (freezes), we refer to the heating of the trays as to a temperature approximately that of the freezing temperature of the plastic bronze.

Neither the tray nor the molten bronze temperatures are definitely fixed nor particularly critical, so long as the temperature which the two attain upon or shortly after the pouring step is above the temperature at which the plastic bronze freezes. It will be appreciated, however, that the plastic bronze must of necessity be heated to a temperature somewhat above the point at which it becomes completely molten in order that it shall remain liquid during the pouring of the same into the pans, and we recommend that such overheating shall be to the extent of from 100° F. to 200° F. above its freezing point. We include, therefore, as a step of our process, specifically defined, the heating of the plastic bronze to a temperature above its freezing point and, while for safety's sake (to more certainly prevent solidification or undue chilling of the plastic bronze before pouring) the bronze should be heated to around 100° to 200° F. above its freezing point, and may under unusual cooling conditions need to be overheated even more, the extent of overheating required is indefinite and depends largely upon concomitant condition so long as the overheating is sufficient to keep the plastic bronze in a liquid condition until it is poured into the pans and has spread over their bottoms.

In order that the interior of the tray 15 shall be clean and free from iron oxide, scale or other substance which would interfere with the formation of a fused bond between the same and the plastic bronze a suitable flux such, for example, as boric acid, and which is indicated by the numeral 18, is placed in the tray before it is introduced into the furnace 16. This flux will begin to soften at a temperature around 1100° F. and by the time the tray has attained the desired temperature of 1800° F. to 2100° F. will have become fluid, and will have spread over the entire interior of the tray and dissolved such film of oxide as may have been thereupon initially, or which may have been formed during the heating of the tray.

If the furnace 16 is open to the atmosphere, as shown, the interior thereof will contain more or less oxygen, and the tray will become coated with a film of iron oxide which, however, will be dissolved by the flux as above explained. A neutral and non-oxidizing or a reducing gas may, however, be supplied to the interior of the furnace as through a suitable conduit, in which case the formation of an oxide coating upon the tray will be greatly reduced or entirely avoided during the heating of the tray, and little or no oxide film will form upon the unprotected bottom of the tray during the short time between the removal thereof from the furnace and the pouring and quenching steps which follow the heating step.

As an alternative method of both heating the trays and applying a coating of flux thereto they may be dipped into a bath of molten and highly heated flux composed, for example, of 75% of borax and 25% of boric acid, the bath being at a temperature of 1800° F. to 2500° F. In this case the trays are heated by the highly heated flux, and are coated all over thereby thus providing protection against oxidation for the exposed surface thereof as well as for the surface to which the plastic bronze is applied. This method of heating, however, is somewhat less convenient than heating by the use of a suitable furnace; and if the same is employed surplus flux should be wiped off the under sides of the trays before the molten bronze is supplied to them as such flux, if present to any considerable extent, interferes somewhat with the cooling of the trays and the molten bronze which they contain in a following quenching step of the process.

The trays after having been heated and fluxed are removed from the furnace and transferred to and supported above and by a cooling device contained in an enclosing housing 19 having a drain outlet conduit 20. The cooling device per se may be of various forms so long as it is suitable for cooling (quenching) the trays and the molten plastic bronze in them as quickly as possible, and to a temperature below that at which the molten plastic bronze freezes. The preferred form thereof illustrated, however, comprises a casing 21 having a number of transverse screens 22 between two of which there is a mass of copper wool 23 or equivalent substance the purpose of which is to secure a uniform upward flow of water supplied to the casing through a water supply conduit 24, having downwardly directed discharge holes 25; these cooling device elements and features being provided, as stated, to break up localized currents and secure a uniformly distributed flow of water upward through the casing. The upper end of the casing is covered by a perforated plate 26 through which water flows and contacts with the bottom of a tray supported by conical supports 27, as many as may be deemed necessary; the tray being guided into proper position upon the supports by suitable guides 28. The area of the plate 26 corresponds, approximately, with the area of the tray to be quenched; and the features of the cooling device described secure a uniform and evenly distributed flow of a large volume of water free from turbulence therethrough and against the under surface of the pan or tray.

While we have described the cooling device as it acts to quench the pans it will be appreciated that the water is not supplied thereto through the conduit 24 until after molten plastic bronze has been poured into the pan resting upon the supports 27 and has had time to flow over the bottom of the pan and as soon as practicable after a pan has been placed upon the said supports molten plastic bronze at a temperature sufficiently above its freezing point to maintain its fluidity is supplied to the tray as from a pouring ladle 30, the amount of molten plastic bronze thus supplied to the tray being in excess of the quantity necessary to provide the bearing layers or facings of finished bearings made from the bottom of the tray as hereinafter explained. This pouring ladle may be of any kind but is illustrated as of the valved type adapted to be pressed down into a mass of molten plastic bronze in a crucible wherein it is melted, and a valve 31 which controls an opening 32 in its bottom then opened, whereupon molten bronze free from dross upon its surface in the crucible enters the ladle. Pouring, as will be appreciated, is accomplished by moving the crucible 30 into position over a tray and then opening the valve 31.

The pans will naturally cool somewhat after being removed from the furnace and before the molten plastic bronze is supplied to them, and the bronze itself will cool somewhat in the ladle and during the pouring step; and as hereinbefore stated both the temperature to which the pans are heated and the temperature to which the plastic bronze is heated above that at which it becomes completely molten, may vary throughout the ranges mentioned or to approximately that extent. The equalized temperature after pouring, however, is necessarily above the freezing temperature of the plastic bronze; and quite obviously the higher the temperature to which the bronze is heated before pouring the lower may be the temperature of the trays, or the greater may be the loss of heat by radiation, without disturbing the requisite condition that the equalized temperature after pouring shall be above the temperature at which the plastic bronze freezes.

After the molten plastic bronze has been poured into the highly heated pan and has spread over the bottom thereof the bronze and pan bottom fuse together and form an inseparable bond throughout their area of contact. This fusing occurs immediately, although slight cooling of the bronze before the following sudden cooling step is not objectionable; and the next step of the process consists in the rapid cooling or quenching of the highly heated pan and of the molten bronze therein from their temperature after pouring to a temperature below that at which the plastic bronze freezes and becomes solid. This cooling step should be performed as rapidly as possible; the plastic bronze must be in a liquid condition at the beginning thereof, that is it must not have become chilled solid or frozen before the cooling step commences; and in order that the cooling shall be brought about as quickly as possible it is effected by bringing a large volume of water in rapid motion into immediate contact with and uniformly distributed throughout the under surface of the pan bottom.

According to our understanding as to what happens when molten plastic bronze is supplied to the highly heated pan and flows over the bottom thereof, an intermingling of molecules occurs throughout the area of contact between the pan bottom and the bronze therein and, the tendency of the iron molecules to form an alloy with the copper content of the bronze being greater than the tendency of the iron to alloy with the lead (if indeed there is any such tendency), it follows that an alloy of iron and copper is formed along the meeting surface between the parts by the intermingling of molecules and the fusing of the two together along the bonding surface between them. This, according to our understanding, is a phenomenon involving the highly heated pan bottom and the bronze therein while the latter is in a liquid condition, and at this time there are no doubt some lead molecules adjacent the meeting surface but unalloyed with the pan bottom or at least not strongly combined therewith; and the next rapid cooling step of the process drives the lead molecules away from the bonding surface and forms a laminae between the pan bottom and the bronze around .003″ thick throughout which there is no appreciable lead; the bond after the rapid cooling step being formed by an alloy of iron and copper and throughout which no appreciable amount of lead is present.

The next step of our process consists in the sudden and drastic cooling of the trays and of the plastic bronze in them from a temperature above that at which the bronze freezes to a temperature below that temperature. This is done in the conventional apparatus illustrated by opening a valve 29 in the conduit 24 and permitting water to flow through the cooling device and from the upper end thereof and into the surrounding casing 19, the surface of the water rising and coming into contact with the bottom of the tray (but not with the liquid bronze therein) thus cooling it uniformly and throughout its entire area and solidifying or freezing the liquid plastic bronze contained therein.

The sudden cooling of the molten bronze from a temperature above its freezing temperature secures a fine texture thereof, that is it prevents the formation of metallic crystals of appreciable size such as are formed during slow cooling of a molten metal; and it further prevents the lead content from segregating from the copper of the bronze, which would occur during slow cooling of such a mixture; because the copper, having a much higher melting point than the lead, would solidify first and leave the lead in a liquid state. With sudden and drastic cooling the copper (the freezing point of which is around 225 F. degrees above that of the plastic bronze mixture and around 1350 F. degrees above that of the lead) is solidified practically instantaneously, with the result that the lead though still liquid is grasped and held as in a matrix by the solidified copper before it can segregate itself in large particles. It follows, therefore, that the lead is uniformly distributed throughout the mass of the bronze in the finished bearing.

Another result due to the fact that the cooling of the pans is from their bottoms toward and through the plastic bronze therein (because the cooling water contacts with the bottoms of the pans) is that the lead is repelled—pushed away from the meeting surface between the steel pan bottoms and the liquid bronze by the copper as it solidifies in advance of the lead, thus leaving copper only at the joint and at the bond which results from the cooling step. We have in fact found by analysis that where the metals meet there is an alloy substantially free from lead, and which at the same time contains but little iron because the steel back, even though at a temperature substantially that of the molten bronze, is still solid and unable to alloy as freely as a liquid metal would with the copper constituent of the molten bronze.

The cooling, while it must be from a temperature above that at which the bronze becomes molten to a temperature sufficiently below that at which the bronze freezes to insure complete solidification thereof throughout its mass, need not be to a temperature approximating that of the surrounding atmosphere in order to secure the fused joint between the parts which is characteristic of bearings produced in accordance with our process. We prefer, however, that the cooling shall be to substantially atmospheric temperature, as in that case such surplus flux as may remain on the pans forms a brittle layer which when it becomes dry separates readily therefrom, so that the surplus flux may be used over again.

After molten plastic bronze has been supplied to the trays and the trays and bronze have been cooled as aforesaid, the resulting article is freed of remaining small particles of solidified flux by sand blasting or other suitable method to place the same in such a condition that it may be operated upon without unduly dulling the tools used in the making of finished bearings therefrom. The upstanding border of the trays is next removed by sawing, milling, or otherwise as indicated at 33, Figure 4; and the resulting slab, if materially warped by the high temperature and rapid cooling steps is flattened by any suitable pressing or rolling operation. The slab is next slitted, as indicated at 34, Figure 4, to produce rough unfinished strips 35 having steel backs 36 formed by parts of the bottom of the tray, and facings 37 of plastic bronze fused to said backs. The more or less rough and exposed surface of the bronze is next removed by a planing, milling, or similar operation to produce flat plastic bronze faced strips 38, Figure 5, of uniform thickness, and from which finished bearings are formed by suitable bending and finishing operations.

The strips 38 are next bent into semi-circular form as indicated in Figure 6 by means of suitable dies, by bending rolls, or otherwise; and either before or after the bending the sides of the strips are chamfered, as at 39, Figure 7. The ends 40 of the semi-circular members are shaved so that two such members will form a circular assembly conforming, as near as possible, with a finished two-part bearing. Two such half bearings are next assembled and held between end plates 41, 41 carried by a rotating mandrel 42, as indicated in Figure 8; and the exterior of the steel backs is ground or otherwise finished to the diameter of the bearing to be produced. The two half bearings are next held in a suitable cup or draw-in chuck not shown, and the interior of the bronze facings finished to the diameter required; after which they are held upon a mandrel 43, Figure 9, by a clamp 44, and the chamfered sides 39 of the parts faced off to produce finished bearings the parts of which have the general appearance shown in Figure 6. The bronze-faced strips 38 may, however, be made into bearings by steps other than those above outlined, and bearings of completely circular form may, if desired, be made from them instead of semi-circular or half bearings such as are above described.

Figures 10 to 12 show apparatus better suited for the production of bearings in considerable quantities than the conventional apparatus illustrated in Figures 2 and 3; and a furnace wherein the trays are heated, and the molten plastic bronze is supplied to them all in a neutral non-oxidizing or in a reducing atmosphere so that, assuming the trays to be in a reasonably clean condition before heating, it is unnecessary that any flux be used; although the trays may be fluxed in working with this form of furnace if such a course is deemed desirable or necessary.

In this apparatus the trays 15 are supplied to the left-hand inlet end of the furnace 49 by any suitable feeding mechanism, and are heated as they travel therethrough to the temperature hereinbefore referred to in describing my process. A neutral or reducing gas is supplied to the interior of this furnace so that the trays do not become coated with an iron oxide film during the heating operation; and if a flux is to be used to secure a more perfect bonding of the plastic bronze to the tray bottoms it is ordinarily supplied to the trays before they enter the furnace.

Adjacent the right hand end of the furnace is a crucible 50 containing molten plastic bronze, and which is heated by a resistance heating element 51; which crucible has a valve controlled outlet in its bottom controlled by a normally closed valve 52 arranged to be opened by an electromagnet 53. An intermittently operated cam 54 driven by an electric motor 55 operates a reciprocating bar 56 having a plurality of upwardly extending rods 57 adapted to receive the trays 15 upon their upper ends, to support them while molten plastic bronze is supplied to them, and to lower said trays into a position adjacent a cooling device which may be similar to the cooling device hereinbefore described; or may be in the form of a pan 58 to which water is supplied through a conduit 45 which is controlled by a valve 46. Movement is transmitted to the bar 56 and rods 57 through a spring 59 from a shoe 60 with which the cam 54 engages, the spring being strong enough to support the trays 15 when they are empty but not after molten plastic bronze has been supplied to them.

The parts are so timed that the upper ends of the rods reach a level near but below that of the hearth of the furnace when an unheated tray is to be fed into the inlet thereof, and when another tray is thus supplied the tray furthest to the right is pushed onto the upper end of the rods 57. The cam 54 has not yet lifted the bar 56 to its highest position but during further movement it does so and the rods 57 lift the tray into the position shown in Figure 10.

As the rods 57 approach the end of their upward movement, the bar 56 moves a pivoted spring operated switch 61 into a position to close a circuit 62 in which the electromagnet 53 is included, whereupon the valve 52 is lifted and molten plastic bronze flows into the tray 15 as shown.

The weight of the tray with the bronze therein compresses the spring 59 and depresses the bar 56, thus breaking the circuit 62 as the switch 61 is moved by its spring 63. The breaking of the circuit 62 deenergizes the magnet 53 and permits the valve 52 to close, thus interrupting the supply of molten bronze to the pan 15; and the switch 61 presently closes a relay circuit 64 thus energizing a relay 65 which controls a normally open circuit 66 through which current is supplied to the motor 55.

The motor, therefore, which was stopped when the bar 56 engaged the switch 61 and broke the relay circuit 64 near the end of its upward movement, is now started; and as the cam 54 rotates the rods 57 with the tray supported upon their upper ends lowers the tray into a position just above the cooling device 58, and the tray is suddenly cooled by water supplied to the cooling device through the conduit 45. The water, as will be appreciated, rises and contacts with the bottom of the pan and overflows into a housing 47, from which it flows through a waste conduit 48, substantially as in the form of cooling device hereinbefore described. The trays are removed from the rods 57 through an opening 68 after they have been cooled, and by any suitable device or mechanism.

While the immediately preceding explanation contemplates automatic operation of the apparatus illustrated in Figure 10 the spring 59, and the feature of operating the switch 61 by the bar 56, may be omitted, and the switch may be operated manually. In that case an operator by looking through the sight opening 67 may control the supplying of molten plastic bronze to the trays, and the cooling of the trays, by operating the switch 61 by hand, while at the same time all the advantages incident to the performing of the whole process in a neutral or a reducing atmosphere, will be retained; and the idea of non-automatic operation retaining, however, the advantages incident to a non-oxidizing atmosphere within the furnace may be carried still further by operating the valve 52 and the bar 56 and rods 57 manually.

Figure 11 illustrates a form of melting crucible for the plastic bronze wherein the quantity thereof supplied to a tray is definitely measured, and uniform quantities thereof are supplied to successive trays. In this form the opening of the valve 69 by the lever 70 permits molten bronze to flow into and fill the chamber 71, whereupon and by opening the valve 72 by the lever 73 the definite and measured quantity of plastic bronze within the chamber 71 flows therefrom and into a tray beneath the crucible, the same as in Figure 10. The crucible 74 is enclosed in a casing 75, and the main part thereof as well as the measuring chamber 71 are both heated by resistance members 76 through which a current of electricity flows, as will be understood from the drawing.

It will be appreciated that the trays with plastic bronze within them produced by the apparatus illustrated in Figure 10 will, after the cooling step, be converted into finished bearings in the same way as hereinbefore explained in connection with Figures 4 to 9.

Having thus described and explained our invention we claim and desire to secure by Letters Patent:

1. The method of making a bearing which consists in providing a shallow iron or steel tray having a side wall extending around the periphery thereof; heating said tray to a temperature corresponding approximately with that at which plastic bronze melts; supplying molten plastic bronze to said tray while said tray is at rest, the amount of plastic bronze supplied to said tray being in excess of the amount thereof upon a finished bearing made from the bottom wall of said tray; applying a cooling liquid to the bottom of said tray to thereby cool the same and the liquid plastic bronze contained therein rapidly from a temperature above the freezing temperature of said plastic bronze to a temperature below said freezing temperature while said tray is at rest; bending a strip formed from the bottom of said tray into curved form; and finishing said bent strip to make it into a bearing member.

2. In a method for making a bearing, the steps which consist in providing a shallow iron or steel tray having a side wall extending around the periphery thereof; heating said tray to a temperature approximately 1900° F.; supplying molten plastic bronze to said tray while said tray is at rest, the amount of plastic bronze supplied to said tray being in excess of the amount thereof upon a finished bearing made from the bottom wall of said tray; and applying a cooling liquid to the bottom wall of said tray to thereby cool the same and the liquid plastic bronze contained therein rapidly from a temperature above the freezing temperature of said plastic bronze to a temperature below said freezing temperature.

3. In a method for making a bearing, the steps which consist in providing a shallow iron or steel tray having a side wall extending around the periphery thereof; heating said tray to a temperature corresponding approximately with that at which plastic bronze melts; supplying molten plastic bronze heated to a temperature substantially above its melting temperature to said tray while said tray is at rest, the amount of plastic bronze supplied to said tray being in excess of the amount thereof upon a finished bearing made from the bottom wall of said tray; and applying a cooling liquid to the bottom of said tray to thereby cool the same and the liquid plastic bronze contained therein rapidly from a temperature above the freezing temperature of said plastic bronze to a temperature below said freezing temperature while said tray is at rest.

4. In a method for making a bearing, the steps which consist in providing a shallow iron or steel tray having a side wall extending around the periphery thereof; heating said tray to a temperature corresponding approximately with that at which plastic bronze melts; supplying molten plastic bronze to said tray while said tray is at rest, the amount of plastic bronze supplied to said tray being in excess of the amount thereof upon a finished bearing made from the bottom wall of said tray; and applying a cooling liquid to the bottom of said tray to thereby cool the same and the liquid plastic bronze contained therein rapidly from a temperature above the freezing temperature of said plastic bronze to a temperature below said freezing temperature.

5. The method of making a bearing which consists in providing a shallow iron or steel tray having a side wall extending around the periphery thereof; heating said tray in a non-oxidizing or reducing atmosphere to a temperature corresponding approximately with that at which plastic bronze melts; supplying molten plastic bronze to said tray while it is still in the non-oxidizing or reducing atmosphere aforesaid and while said tray is at rest, the amount of plastic bronze supplied to said tray being in excess of the amount thereof upon a finished bearing made from the bottom wall of said tray; applying a cooling liquid to the bottom of said tray to thereby cool the same and the liquid plastic bronze contained therein rapidly from a temperature above the freezing temperature of said plastic bronze to a temperature below said freezing temperature; bending a strip formed from the bottom of said tray into semi-circular form; and finishing said bent strip to make it into a bearing member.

6. In a method for making a bearing, the steps which consist in providing a shallow iron or steel tray having a side wall extending around the periphery thereof; heating said tray in a non-oxidizing or reducing atmosphere to a temperature corresponding approximately with that at which plastic bronze melts; supplying molten plastic bronze to said tray while it is still in the non-oxidizing or reducing atmosphere aforesaid and while said tray is at rest, the amount of plastic bronze supplied to said tray being in excess of the amount thereof upon a finished bearing made from the bottom wall of said tray; and applying a cooling liquid to the bottom of said tray to thereby cool the same and the liquid plastic bronze contained therein rapidly from a temperature above the freezing temperature of said plastic bronze to a temperature below said freezing temperature.

7. As an article of manufacture for use in making a plastic bronze faced bearing, a shallow iron or steel tray having a side wall extending about the periphery thereof, and a layer of plastic bronze therein, and which layer is fused to the bottom of said tray so as to be inseparable therefrom and is thicker than the facing of a bearing made from the bottom wall of said tray.

8. A bearing strip formed from the bottom of a shallow iron or steel tray such as defined in claim 7.

9. A bearing formed from a piece of the bottom wall of a shallow iron or steel tray such as is defined in claim 7, by bending said piece into circular form so as to make a bearing therefrom.

ALFRED L. BOEGEHOLD.
ALFRED W. SCHLUCHTER.
R. H. TERRY.